Figure 1:
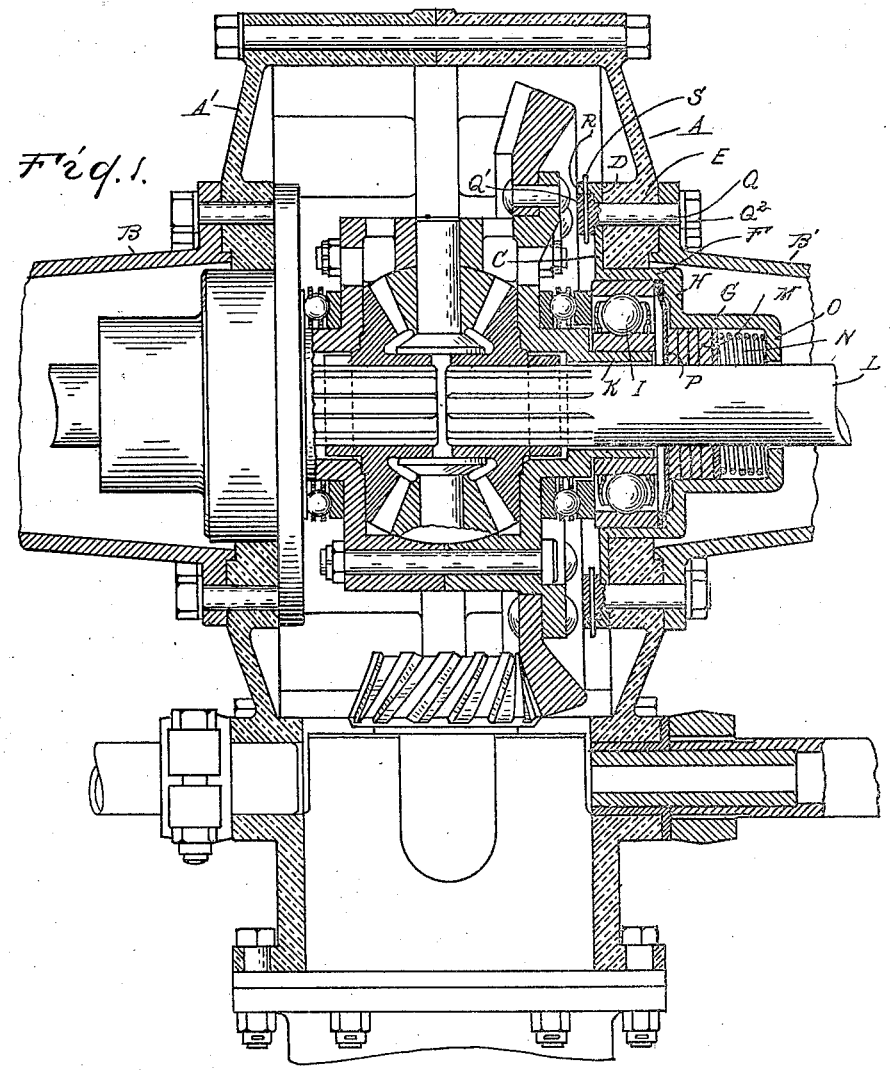

Oct. 30, 1923.

E. H. SHERBONDY 1,472,441

VEHICLE DRIVE AXLE

Filed April 11, 1921

Inventor
Earl H. Sherbondy

By Whittemore Hulbert Whittemore
+Belknap    Attorneys

Patented Oct. 30, 1923.

1,472,441

UNITED STATES PATENT OFFICE.

EARL H. SHERBONDY, OF DETROIT, MICHIGAN, ASSIGNOR TO SIDNEY D. WALDON, OF DETROIT, MICHIGAN.

VEHICLE DRIVE AXLE.

Application filed April 11, 1921. Serial No. 460,421.

*To all whom it may concern:*

Be it known that I, EARL H. SHERBONDY, a citizen of the United States of America, residing at Detroit, in the county of Wayne and State of Michigan, have invented certain new and useful Improvements in Vehicle Drive Axles, of which the following is a specification, reference being had therein to the accompanying drawings.

The invention relates to vehicle drive axles and has reference to various features of construction as hereinafter set forth.

In the drawings:

The figure is a longitudinal section through the central portion of the axle housing;

One of the features of the invention is the construction of the axle housing and particularly the portion thereof which encloses the differential gearing. In order to limit the weight, the central housing for the gearing is preferably formed of aluminium castings A and A', while the tubular portions B and B' which enclose the axle shaft sections, are formed of steel. It is difficult to form satisfactory attachment between the steel and the aluminium as the latter is too soft for securely engaging screw-studs and if headed bolts are used, there is danger of the heads pulling in to the aluminium body. It is also necessary to provide a better wearing material than the aluminium for receiving the race members of the ball or roller bearings which support the axle shaft sections. I have, therefore, devised a construction in which a single member forms a clamping plate for engaging the aluminium case and also forms a holder for the bearings and for the lubricant sealing means.

In detail, C is a member, preferably formed of pressed sheet metal, which has a flange D lying parallel to the inner face E of the aluminium housing A. The member C also has a cylindrical portion F, which passes through the central aperture in the housing A and a cylindrical portion G of reduced diameter with a shoulder or abutment portion H therebetween. The recess formed by the cylindrical portion F and shoulder H provides a seat for the ball or other bearing I and also abutment for taking the thrust of the end-thrust bearing J. These two bearings, respectively, receive the radial and end-thrust from the hub K of a differential gearing surrounding the drive axle section L. The reduced cylindrical portion G contains a series of washers of felt or other suitable material M for retaining the lubricant within the differential gearing housing and this material is placed under compression by a spring N abutting against a flange O at the outer end of the member C. There is also a retaining ring P, which is pressed into the cylindrical portion F and abuts against the opposite end of the packing M. The flange D is provided with a series of apertures which register with corresponding apertures in the housing member A, through which are passed the clamping Q for securing the tubular extensions B and B'. The bolts Q are headed at their inner ends and the heads Q' are partly cut away to lock with an inwardly turned flange R at the periphery of the flange D. Also the bolts are secured from displacement by cotter pins S, which pass through registering apertures in the flange R and heads Q'.

With the construction as thus far described in assembling the axle the differential gearing of any suitable construction is first assembled, after which the members A and A' of the housing are placed on opposite sides of the gearing and centrally clamped to each other. The members C have previously been pressed into engagement with the members A and A' and the bolts Q secured by the cotter pins S. The tubular members B and B' may then be placed in registration with the members A and A' and engaged with the bolts Q, after which nuts Q² are engaged with said bolts to clamp the parts together. The flange D of the member C being formed of steel will distribute the clamping pressure of the bolts Q to the aluminium casting, relieving said casting from any stress other than that of direct compression. A further function performed by the member C is to provide a seat for the bearing I, which permits the slow revolution of the race member thereof when the axle is in operation. It also provides an end thrust abutment for the bearing and a housing for the sealing means formed by the felt washers M.

What I claim as my invention is:

1. In an axle, the combination with a housing for the differential gearing, of a tubular extension for said housing engaging an outer wall thereof, a tubular member for receiving a supporting bearing for the differential gearing having a flange engaging the inner face of the wall of said housing, and clamping bolts passing through said flange, housing wall and engaging said tubular extension to clamp the same in position.

2. In an axle, the combination with a housing for the differential gearing formed of light relatively soft material, of a tubular extension for said housing formed of harder material having a flange for abutting against the outer wall of said housing and concentric with an aperture therein, a member forming a seat for the differential supporting bearing engaging the aperture in said housing wall and having a flange extending adjacent to the inner face of said wall, and clamping bolts passing through said flange, housing wall and the flange on said tubular extension to clamp the latter in position.

3. In an axle, a housing for the differential gearing formed of light comparatively soft material and centrally apertured, a member formed of harder material constituting a seat for the differential supporting bearing engaging said aperture, a flange on said member extending adjacent to the inner face of the wall of said housing, a tubular extension for said housing having a flange engaging the outer face thereof, and clamping bolts passing through the two flanges and the intermediate wall of the housing for securing said parts together.

4. In an axle, a housing for the differential gearing centrally apertured, a tubular extension for said housing flanged to engage the outer wall thereof, a member engaging the aperture in said housing forming a seat for the differential supporting bearing, a flange on said member adjacent to the inner face of the wall of said housing, headed bolts engaging said flange and passing through said housing wall and the flange of said tubular extension, and means for locking said headed bolts to said flange.

5. In an axle, the combination of a housing for the differential gearing, centrally apertured in the end thereof and a tubular extension of said housing having a flange engaging a portion thereof surrounding said aperture, a member cupped to form a seat for a bearing engaging said aperture, a flange on said member lying adjacent to the inner wall of the casing, a series of bolts extending through said flanged and aligned apertures in said housing and flange on said tubular extension, said bolts clamping all of said members together.

6. In an axle, the combination of a housing for the differential gearing centrally apertured, a tubular extension having a flange engaging the portion of said housing surrounding said aperture, a member having a flange for engaging the inner wall of said housing, a cup portion passing through said aperture and forming a seat for a bearing, a cup portion of smaller diameter forming an end abutment for said bearing, packing in said cup portion of smaller diameter, and bolts passing through registering apertures in the flanges of said cup member, said tubular extension, and the intermediate wall of the housing.

7. In an axle, the combination of a housing for the differential gearing having an aperture in the end wall thereof, a tubular extension for said housing provided with a flange engaging the portion surrounding said aperture and a member having a cup portion for receiving a bearing engaging the aperture in said housing, a flange lying adjacent to the inner face of the housing wall, bolts passing through aligned apertures in said flanges and the intermediate wall of the housing, heads on said bolts engaging the flange of said cup member, a peripheral flange on said last-mentioned flange for engaging cut-away portions of said heads to hold said bolts from turning, and securing means for said bolts to said peripheral flange.

8. In an axle, the combination with a housing for the differential gearing, of a tubular extension for said housing engaging the outer wall thereof, sealing means for retaining a lubricant within said differential gearing, an annular member engaging the inner face of the wall of said housing and having a portion holding said sealing means, and bolts clamping said housing wall between said member and said extension.

9. In an axle, the combination with a housing for the differential gearing, of a tubular extension for said housing engaging an outer wall thereof, an annular member engaging the inner face of the wall of said housing and having a portion holding a supporting bearing for the differential gearing, and bolts clamping said housing wall between said member and said extension.

In testimony whereof I affix my signature.

EARL H. SHERBONDY.